United States Patent
Dudgeon et al.

(10) Patent No.: US 8,539,184 B2
(45) Date of Patent: Sep. 17, 2013

(54) ON DEMAND STORAGE GROUP MANAGEMENT WITH RECAPTURE

(75) Inventors: Kyle Barret Dudgeon, Vail, AZ (US); Dustin A. Helak, Tucson, AZ (US); David Charles Reed, Tucson, AZ (US); Esteban Rios, Tucson, AZ (US); Max Douglas Smith, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 694 days.

(21) Appl. No.: 12/565,720

(22) Filed: Sep. 23, 2009

(65) Prior Publication Data
US 2011/0072230 A1 Mar. 24, 2011

(51) Int. Cl.
*G06F 12/02* (2006.01)

(52) U.S. Cl.
USPC ..... 711/165; 711/114; 711/170; 711/E12.001

(58) Field of Classification Search
USPC ........... 711/114, 165, 170, E12.001, E12.002
See application file for complete search history.

(56) References Cited

U.S. PATENT DOCUMENTS

| | | | |
|---|---|---|---|
| 6,823,442 B1 | 11/2004 | Cameron | |
| 7,167,880 B2 | 1/2007 | Amano et al. | |
| 7,181,585 B2 | 2/2007 | Abrashkevich et al. | |
| 7,222,176 B1 | 5/2007 | Laurent et al. | |
| 2007/0168634 A1* | 7/2007 | Morishita et al. | 711/170 |

OTHER PUBLICATIONS

Yao, D; Shahabi, Cyrus; Larson; Per-Ake, "Hash-based labeling techniques for storage scaling," The VLDB Journal—The International Journal on Very Large Data Bases archive, vol. 14, Issue 2, Apr. 2005, pp. 222-237, Springer-Verlag, New York.

* cited by examiner

*Primary Examiner* — Jasmine Song
(74) *Attorney, Agent, or Firm* — Nelson and Nelson; Daniel P. Nelson; Alexis V. Nelson (57) ABSTRACT

A method to dynamically adjust the amount of free space in a storage group is disclosed herein. In certain embodiments, such a method may include monitoring the amount of free space in an active storage group. The method may further include maintaining an overflow storage group containing unused volumes. When the free space in the active storage group falls below a lower threshold value, the method may automatically move a volume from the overflow storage group to the active storage group. Conversely, when the free space in the active storage group exceeds an upper threshold value, the method may automatically transfer data from a volume in the active storage group to other volumes in the active storage group, and move the volume from the active storage group to the overflow storage group. A corresponding computer program product and apparatus are also disclosed herein.

13 Claims, 7 Drawing Sheets

ON DEMAND STORAGE GROUP MANAGEMENT WITH RECAPTURE

BACKGROUND

1. Field of the Invention

This invention relates to managing storage systems, and more particularly to apparatus and methods for managing storage groups in storage systems.

2. Background of the Invention

System-managed storage (SMS) refers to applications or programs that enable an operating system to take over many of the tasks of managing storage, tasks that were previously performed manually by systems programmers. When configuring an SMS application, a storage administrator may define classes of storage and rules designating how data sets are allocated to these classes of storage. Once the SMS application is properly configured, the SMS application may automatically perform tasks such as allocating data sets to appropriate storage volumes, backing up the data sets, managing space in the storage volumes or groups of storage volumes, and migrating older data sets to less expensive forms of storage.

SMS applications are important to keep storage costs down and ensure that storage is used efficiently. The costs of storage may include not only the initial cost to purchase the storage, but also costs of electricity to operate the storage, facilities to house the store, and personnel to install, monitor, and/or manage the storage. Although removable media such as optical and tape storage may cost less per megabyte than other types of storage, this type of media may require additional time and resources to locate, retrieve, and mount. Considering all the costs, SMS applications play an important role in controlling and managing storage so a business can grow and expand in a profitable manner.

Currently, most SMS applications use predefined pools or groups of virtual storage devices (e.g., virtual volumes) to store data. These groups are generally static, although system administrators can typically manually add or delete volumes from these groups when needed. The problem with managing storage in this manner is that the amount of storage required by applications using a storage group can vary significantly over time. That is, the amount of storage space required by applications can go up during certain periods of time, and down during other periods of time. Furthermore, these time periods can differ for different storage groups. This makes it difficult to effectively manage the space in storage groups and ensure that storage is allocated in an efficient manner over different periods of time.

In view of the foregoing, what are needed are apparatus and methods to effectively manage space in storage groups. Ideally, such apparatus and methods could automatically increase the space in storage groups during certain periods of time while reducing the space during other periods of time. Further needed are apparatus and methods to tailor the amount of space in a storage group to the particular application or applications using the storage group.

SUMMARY

The invention has been developed in response to the present state of the art and, in particular, in response to the problems and needs in the art that have not yet been fully solved by currently available apparatus and methods. Accordingly, the invention has been developed to provide apparatus and methods for dynamically adjusting the amount of free space in storage groups. The features and advantages of the invention will become more fully apparent from the following description and appended claims, or may be learned by practice of the invention as set forth hereinafter.

Consistent with the foregoing, a method to dynamically adjust the amount of free space in a storage group is disclosed herein. In certain embodiments, such a method may include monitoring the amount of free space in an active storage group. The method may further include maintaining an overflow storage group containing unused volumes. When the free space in the active storage group falls below a lower threshold value, the method may automatically move a volume from the overflow storage group to the active storage group. Conversely, when the free space in the active storage group exceeds an upper threshold value, the method may automatically transfer data from a volume in the active storage group to other volumes in the active storage group, and move the volume from the active storage group to the overflow storage group.

A corresponding computer program product and apparatus are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, these embodiments will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may take the form of a hardware embodiment, a software embodiment (including firmware, resident software, micro-code, etc.) configured to operate hardware, or an embodiment combining software and hardware aspects that may generally be referred to herein as "modules" or a "system." Furthermore, the present invention may take the form of a computer program product embodied in any tangible medium of expression having computer-usable program code stored therein.

Any combination of one or more computer-usable or computer-readable medium(s) may be utilized to store the computer program product. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. In the context of this document, a computer-usable or computer-readable medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages.

The present invention is described below with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
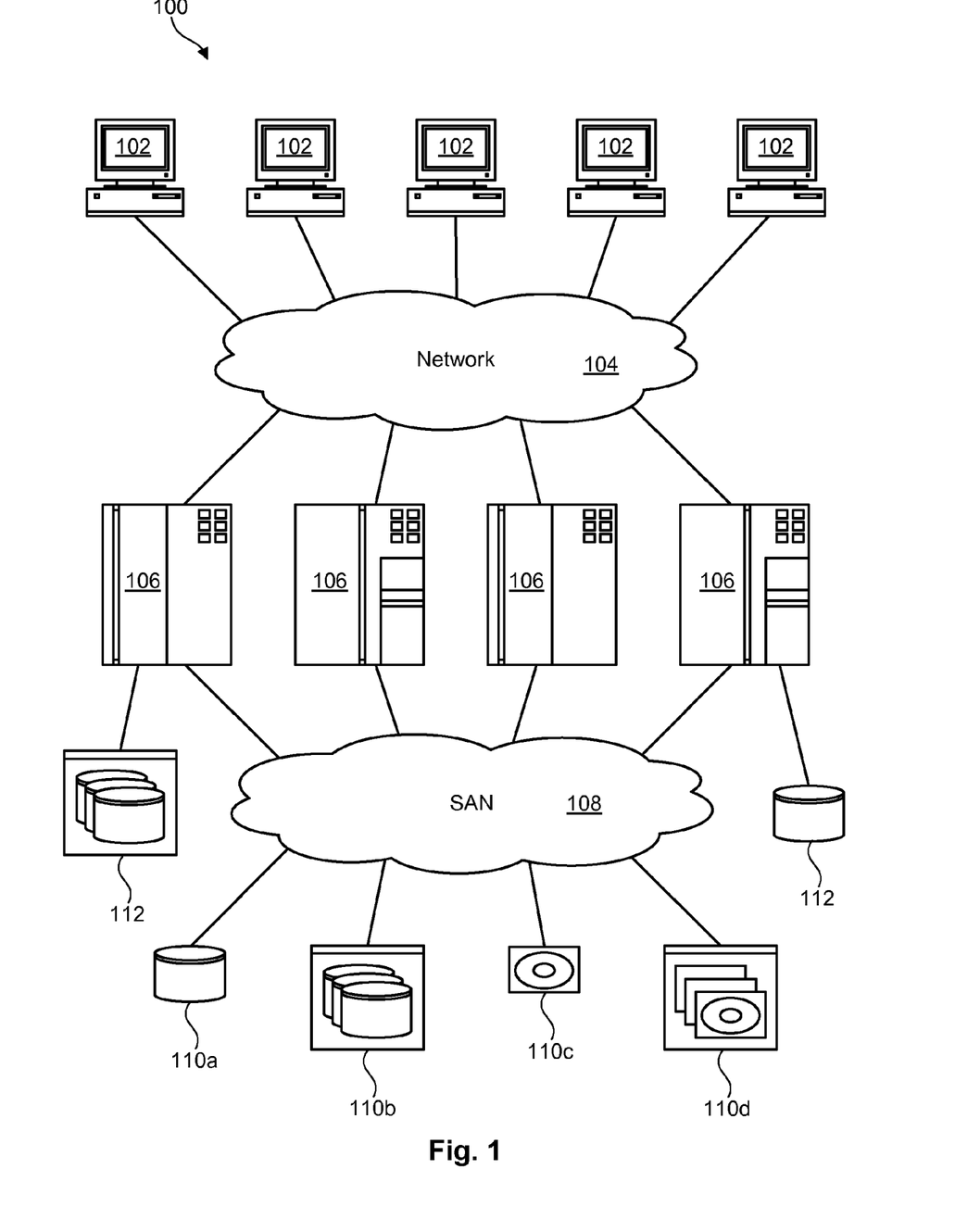
FIG. 1 is a high-level block diagram showing an exemplary computer network environment for implementing an apparatus and method in accordance with the invention.

Referring to FIG. 1, one embodiment of computer network architecture 100 is illustrated. The architecture 100 is presented to show one environment for implementing an apparatus and method in accordance with the invention. The architecture 100 is presented only by way of example and is not intended to be limiting. Indeed, the apparatus and methods disclosed herein may be applicable to a wide variety of different computers, servers, storage systems, and network architectures, in addition to the network architecture 100 shown.

As shown, a computer network architecture 100 may include one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (e.g., open system and/or mainframe servers 106). In general, client computers 102 may initiate communication sessions, whereas server computers 106 may wait for requests from the client computers 102.

The computer-network architecture 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as individual hard disk drives 110*a* or solid state drives 110*a*, arrays 110*b* of hard disk drives or solid-state drives, tape drives 110*c*, tape libraries 110*d*, CD-ROM libraries, or the like. Where the network 108 is a SAN, the servers 106 and storage systems 110 may communicate using a networking standard such as Fibre Channel (FC). In certain embodiments, the servers 106 may directly connect to one or more storage systems 112 or storage devices 112 using, for example, point-to-point connections.

Figure 2:
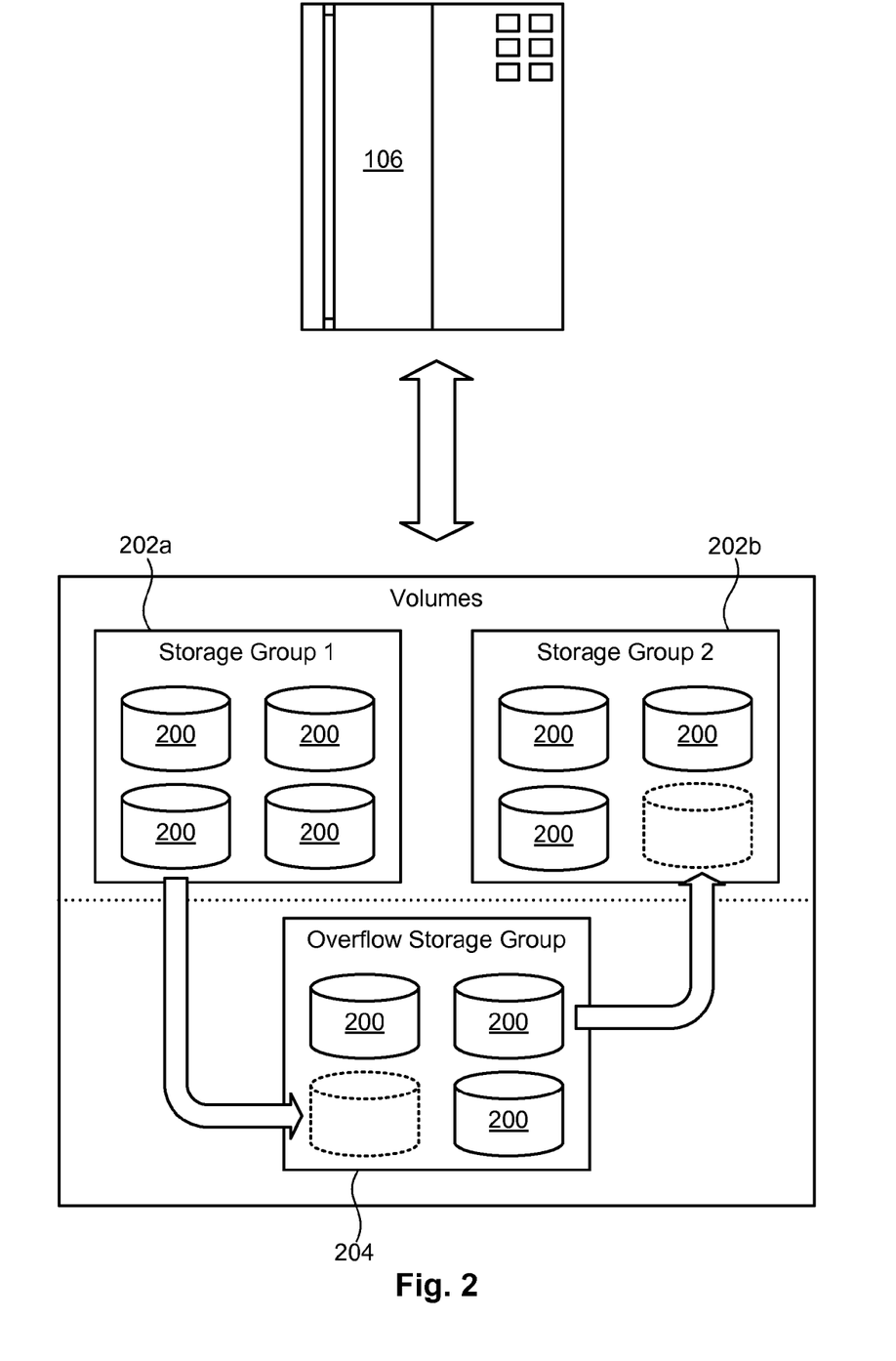
FIG. 2 is a high-level block diagram showing an overflow storage group used to increase or decrease the amount of free space in one or more active storage groups.

Referring to FIG. 2, in certain embodiments, a server 106 or computer 106 (hereinafter referred to as a "host system" 106) may be configured to access one or more volumes 200 in the storage devices 110*a-d*, 112. Each volume 200 may reside on a single physical storage device 110*a-d*, 112 or span several physical storage devices 110*a-d*, 112. Similarly, a single physical storage device 110*a-d*, 112 may store one or multiple volumes 200. These volumes 200 may be considered "logical" drives or storage areas as opposed to physical drives or storage areas. Applications running on the host system 106 may access data in these volumes 200. A system-managed storage (SMS) application may run on the host system 106 and be used to set up and manage these volumes 200.

As previously mentioned, most SMS applications include functionality for defining storage groups 202 containing one or more volumes 200. These storage groups 202 are usually static, although system administrators can typically manually add or delete volumes 200 to or from these storage groups 202. Nevertheless, although the storage groups 202 are static, the amount of storage required by applications using a storage group 202 can vary significantly. That is, the amount of space required by an application can increase during certain periods of time, and decrease during other periods of time. For example, an application's storage requirements may increase during daytime processing, end-of-month processing, end-of-year processing, or during other periods of high demand or usage. Similarly, an application's storage requirements may decrease at night or during periods of reduced activity. These time periods may differ for different applications and thus different storage groups 202. These differences can make it difficult to effectively manage space in storage groups and ensure that storage is allocated in an efficient manner across different time periods.

To more effectively manage free space in storage groups 202, an overflow storage group 204 comprising one or more unused preinitialized volumes 200 may be provided. This overflow storage group 204 may be used to provide additional volumes to the active storage groups 202 (i.e., storage groups 202 actively used by applications running on the host system 106) in the event additional storage is needed. Similarly, the active storage groups 202 may transfer unneeded volumes 200 to the overflow storage group 204 when the volumes are no longer needed. This will allow the active storage groups 202 to dynamically expand and contract as storage needs change. This will also ensure that storage resources are allocated in an efficient manner, thereby reducing storage costs.

Figure 3:
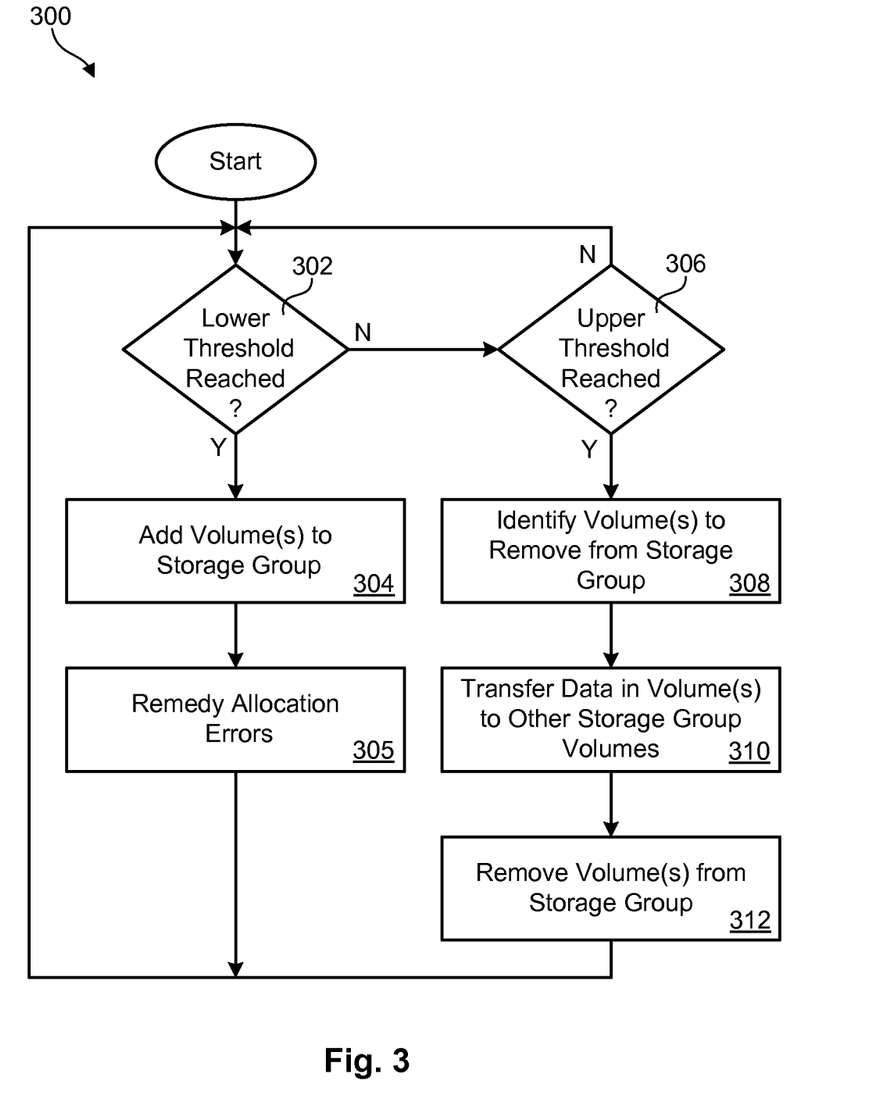
FIG. 3 is a flow chart showing one embodiment of a method for dynamically adjusting the amount of free space in a storage group.

Referring to FIG. 3, in selected embodiments, a method 300 may be used to dynamically increase and decrease the amount of free space in a storage group 202. In general, the method 300 may monitor the amount of free space in an active storage group 202 and expand or contract the storage group 202 accordingly. In certain embodiments, the method 300 may initially determine 302 whether the amount of free space in the storage group 202 has reached a lower threshold value, such as when the amount of free space in the storage group 202 is less than some percentage (e.g., two percent) of the total storage capacity of the storage group 202. If the lower threshold has been reached, the method 300 may add 304 one or more volumes 200 to the storage group 202 from the overflow storage group 204. In certain embodiments, the method 300 may add volumes 200 to the storage group 202 until the amount of free space in the storage group 202 is equal to some multiple of the lower threshold value (e.g., four or six percent free space where the lower threshold value is two percent).

In certain embodiments, the method 300 may optionally attempt to remedy 305 allocation errors that occur as a result of the storage group being out of free space or low on free space. For example, an I/O request such as a write request may fail or a software application may abnormally terminate or crash if the amount of free space in the storage group 202 is insufficient. After adding 304 volumes to the storage group 202, the method 300 may attempt to remedy 305 the allocation error by redriving the I/O or restarting the affected software application.

On the other hand, if the lower threshold has not been reached, the method 300 may determine 306 whether the amount of free space in the storage group 202 has exceeded an upper threshold value. For example, the method 300 may determine 306 whether the amount of free space in the storage group 202 exceeds some percentage (e.g., fifteen percent) of the total storage capacity of the group 202. If the upper threshold has been reached, the method 300 may identify 308 one or more volumes 200 to remove from the storage group 202 so that the amount of free space is below the upper threshold value. As will be explained in more detail hereafter, various techniques or algorithms may be used to identify 308 volumes to remove from the storage group 202. These techniques or algorithms will be discussed in association with FIG. 5.

Once the volumes 200 have been identified 308, the method 300 may transfer 310 data that resides on the volumes 200 to other volumes 200 in the group 202. Once the data has been transferred 310, the method 300 may remove 312 the volumes from the storage group 202 by transferring them to the overflow storage group 204. This will reduce the amount of free space in the storage group 202 and release unneeded volumes so they can be used by other storage groups 202.

Figure 4:
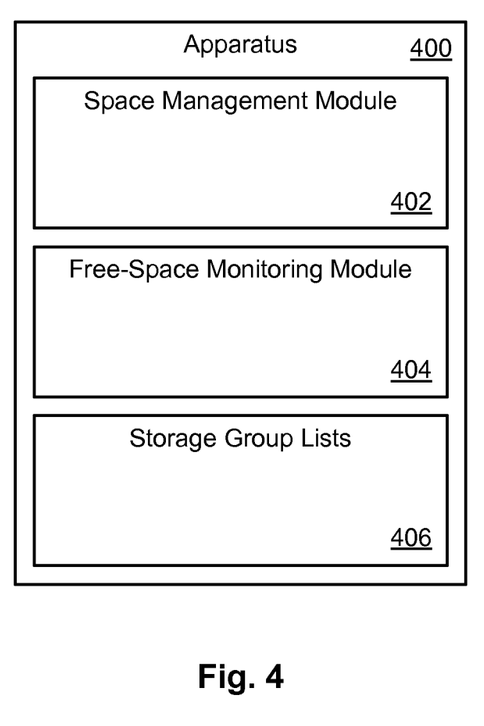
FIG. 4 is a high-level block diagram showing one embodiment of an apparatus for dynamically adjusting the amount of free space in a storage group.

Referring to FIG. 4, in certain embodiments, an apparatus 400 may be used to implement the method 300 of FIG. 3. This apparatus 400 may include one or more modules. These modules may be incorporated into a conventional SMS application or be configured to run in conjunction with a conventional SMS application and add functionality thereto. These modules may be implemented in hardware, software or firmware executable on hardware, or a combination thereof. In selected embodiments, these modules may include a space management module 402, a free-space monitoring module 404, and storage group lists 406.

The storage group lists 406 may include a list for each active storage group 202 and the overflow storage group 204. Each list may store volume identifiers indicating which volumes are associated with a storage group 202, 204. Storage groups 202, 204 may be expanded or contracted by simply moving volume identifiers between the active storage group lists and the overflow storage group list, or alternatively renaming volumes to correspond to volume identifiers in the storage group list or the overflow storage group list. This process will be explained in more detail in association with FIGS. 5 and 6.

A free-space monitoring module 404 may monitor the amount of free space in each of the active storage groups 202. If the amount of free space in an active storage group 202 reaches a lower threshold, the free-space monitoring module 404 may notify the space management module 402 and the space management module 402 may transfer volumes from the overflow storage group 204 to the storage group 202. This may be accomplished by moving volume identifiers from the overflow storage group list to the storage group list or renaming volumes associated with the overflow storage group to match volume identifiers in the storage group list.

Conversely, if the amount of free space in an active storage group 202 reaches an upper threshold, the free-space monitoring module 404 may notify the space management module 402 and the space management module 402 may identify volumes to remove from the storage group 202. The space management module 402 may then transfer data from the identified volumes to other volumes in the active storage group 202. Once the data is transferred, the space management module 402 may remove the volumes 200 from the active storage group 202 and add them to the overflow storage group 204. This may be accomplished by moving volume identifiers from the active storage group list to the overflow storage group list or renaming volumes associated with the active storage group 202 to match volume identifiers in the overflow storage group list.

Figure 5:
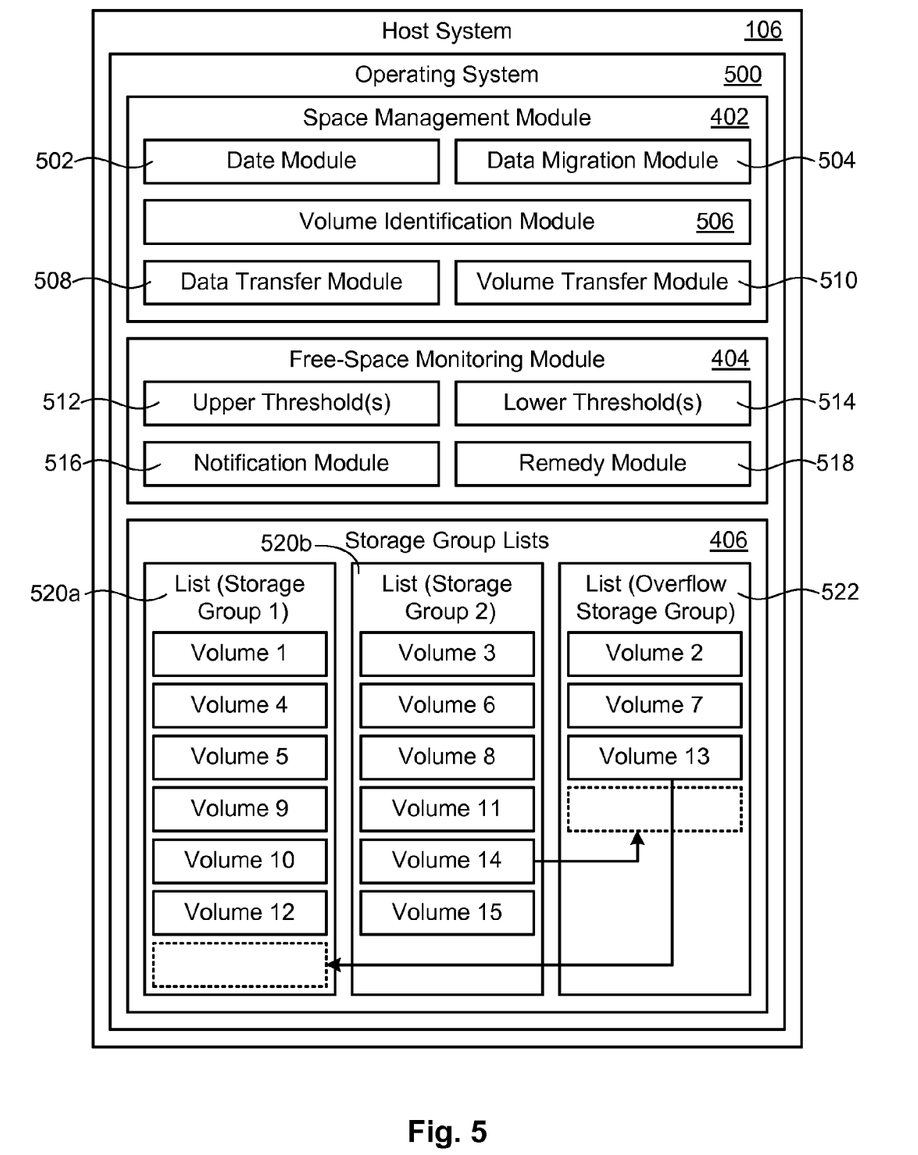
FIG. 5 is a high-level block diagram showing the apparatus of FIG. 4 implemented in a host system.
Figure 6:
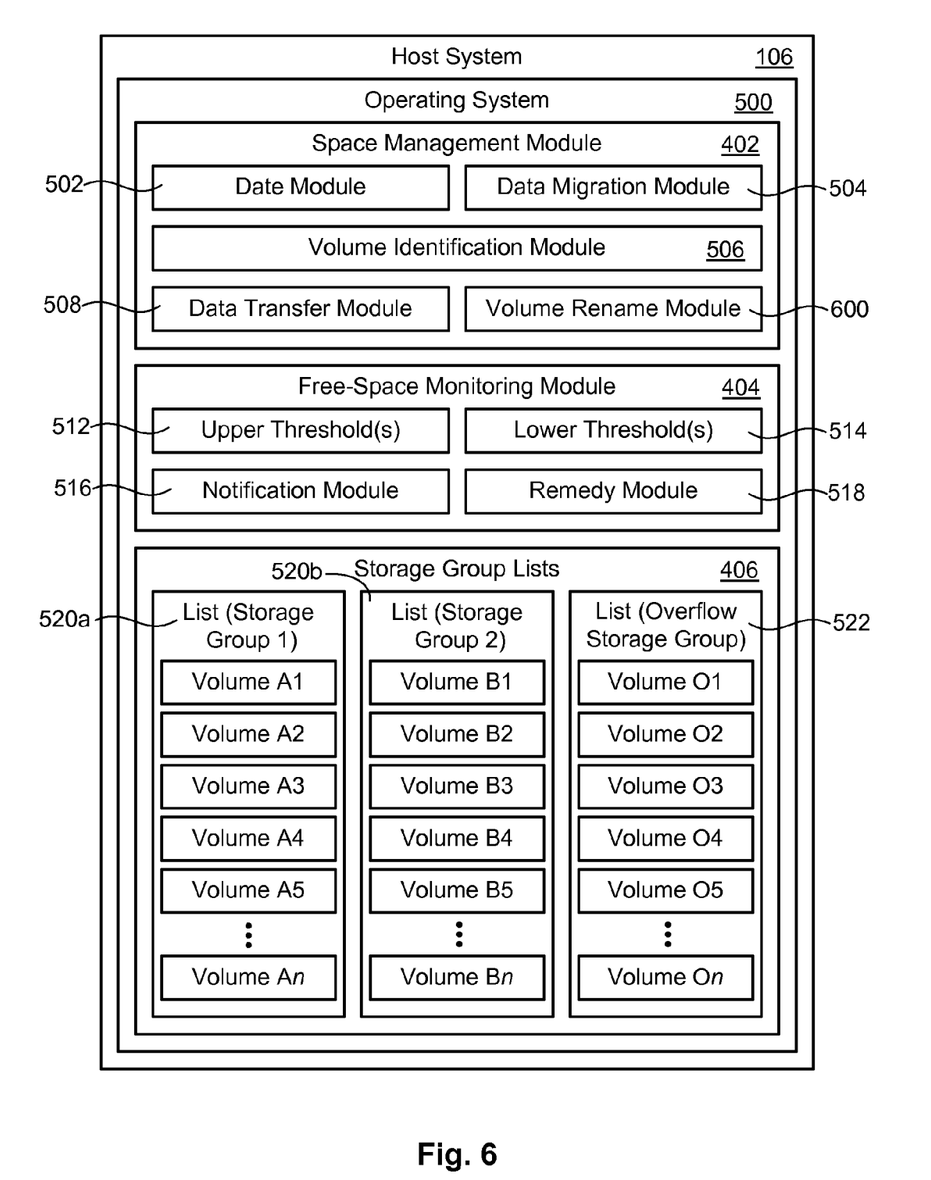
FIG. 6 is a high-level block diagram showing another embodiment of the apparatus of FIG. 4 implemented in a host system.

FIGS. 5 and 6 show several more detailed embodiments of the apparatus 400 of FIG. 4. These embodiments are implemented in the host system 106, although the apparatus 400 is not limited to implementation in the host system 106. For example, the apparatus 400 could be implemented in a storage system 110b, such as that illustrated in FIG. 7, or in some other computing or hardware system. The functionality of the apparatus 400 could also be distributed across multiple devices, such as across a host system 106 and a storage system 110b.

Referring now to FIG. 5, in selected embodiments, a host system 106 may be configured to include a space management module 402, a free-space monitoring module 404, and various storage group lists 406. Each of these modules may run within the host's operating system 500.

The free-space monitoring module 404 may include a lower threshold value 514 for each active storage group 202.

Alternatively, each active storage group 202 may be assigned the same lower threshold value 514. Similarly, the free-space monitoring module 404 may include an upper threshold value 512 for each active storage group 202 or use the same upper threshold value 512 for each active storage group 202. The free-space monitoring module may use these values 512, 514 to monitor the amount of free space in each active storage group 202.

In the event the amount of free space in an active storage group 202 falls below the lower threshold value 514 or exceeds the upper threshold value 512, a notification module 516 may notify the space management module 402 of the event. This will allow the space management module 402 to add or remove volumes 200 from the active storage group 202. In certain embodiments, the free-space monitoring module 404 includes a remedy module 518 to remedy allocation errors that occur as a result of insufficient free space in the storage group 202. For example, the remedy module 518 may remedy the allocation error by instructing the space management module 402 to add volumes 200 to the active storage group 202. The remedy module 518 may then redrive any failed I/O and/or restart a failed software application.

In certain embodiments, the space management module 402 may include a date module 502 to determine the last date that a data set was accessed (i.e., read from or written to) in a storage group 202. If the date of last access exceeds a certain value (e.g., seven days), a data migration module 504 may migrate the data set to another storage group 202, such as a storage group 202 using tape or other low-cost storage media to store data. As data is migrated in this manner, the amount of free space in the active storage group 202 will increase. If the amount of free space reaches the upper threshold value 512, the free-space monitoring module 404 will instruct the space management module 402 to remove one or more volumes 200 from the active storage group 202 and place them in the overflow storage group 204.

In order to remove volumes 200 from an active storage group 202, the space management module 402 may identify one or more volumes 200 to remove from the storage group 202. A volume identification module 506 may be configured to perform this step. The volume identification module 506 may use various techniques or algorithms to determine which volumes 200 to remove from an active storage group 202.

For example, in selected embodiments, the volume identification module 506 may identify the volume 200 in the storage group 202 having the most free-space. This will ideally minimize the time and resources needed to transfer data off the volume 200. In other embodiments, the volume identification module 506 may identify a volume 200 based on location, with the idea that the I/O speed of a locally located volume 200 may be better than a more remotely located volume 200. Thus, more remote volumes 200 may be removed from a storage group 202 before more local volumes 200. In other embodiments, the I/O speed of the volume 200 may be considered. For example, slower-responding volumes 200 may be removed before faster-responding volumes 200. In yet other embodiments, the number of data sets on a volume 200 may be considered. That is, volumes 200 with fewer data sets may be removed before volumes 200 with more data sets. These represent just a few possible criteria that may be used by the volume identification module 506 when selecting a volume or volumes and are not considered to be limiting.

Once a volume has been identified, a data transfer module 508 may transfer data sets stored on the volume 200 to other volumes 200 in the storage group 202. These data sets may be transferred to a single volume or distributed across multiple volumes. This will clear data off the identified volume 200 so that it can be placed in the overflow storage group 204. In certain embodiments, data structures such as the volume table of contents (VTOC), the VTOC index (VTOCIX), and the VSAM volume data set (VVDS) may be cleared and left on the volume 200 so the volume 200 does not have to be reinitialized when assigned to another active storage group 202.

In certain embodiments, the data transfer module 508 may use a fast replication technique (i.e., a data transfer performed mostly by hardware with minimal interaction with the host OS) to transfer data between the volumes 200, if available. Standard I/O (i.e., where the host OS reads data into the host's memory and then issues write commands to a storage device) may be used to transfer data if a fast replication technique is not available.

Once data is transferred off of a volume 200, a volume transfer module 510 may transfer the volume 200 from the active storage group 202 to the overflow storage group 204. As previously mentioned, this may be accomplished by moving a volume identifier associated with the volume 200 from a storage group list to an overflow storage group list. For example, as shown in FIG. 5, each active storage group 202 may include a list 520 and the overflow storage group 204 may include a list 522. Each list 520, 522 may store unique volume identifiers (e.g., volume serial numbers or "VOLSERs") associated with volumes 200 in the respective storage groups 202, 204. In the illustrated example, the volume identifier "Volume 14" is moved from the storage group list 520b to the overflow storage group list 522, thereby moving a volume 200 from storage group 2 to the overflow storage group. Similarly, the volume identifier "Volume 13" is moved from the overflow storage group list 522 to the storage group list 520a, thereby moving a volume 200 from the overflow storage group to storage group 1. Each of these movements may be performed by the volume transfer module 510.

FIG. 6 shows an alternative embodiment to that illustrated in FIG. 5. In this embodiment, instead of moving volume identifiers between the active storage group lists 520 and the overflow storage group list 522, volumes 200 are moved from one storage group to another by renaming the volumes 200. For example, in selected embodiments, each list 520, 522 may have a static list of volume identifiers (i.e., "Volume A1," "Volume A2," "Volume A3," and so forth for Storage Group 1, "Volume B1," "Volume B2," "Volume B3," and so forth for Storage Group 2, and "Volume O1," "Volume O2," "Volume O3," and so forth for the Overflow Storage Group).

In order to move a volume 200 between the storage groups 202, 204, the name of the volume 200 may be changed to match an identifier in a list 520, 522. Thus to transfer a volume 200 from active storage group 1 to the overflow storage group, a volume rename module 600 (which may replace the volume transfer module 510) may rename a volume from "Volume A5" to "Volume O4." In this embodiment, each list 520, 522 may have a number of reserve volume identifiers (not associated with any particular volume 200) than may be used to rename a volume 200, thereby moving a volume 200 from one storage group to another.

Figure 7:
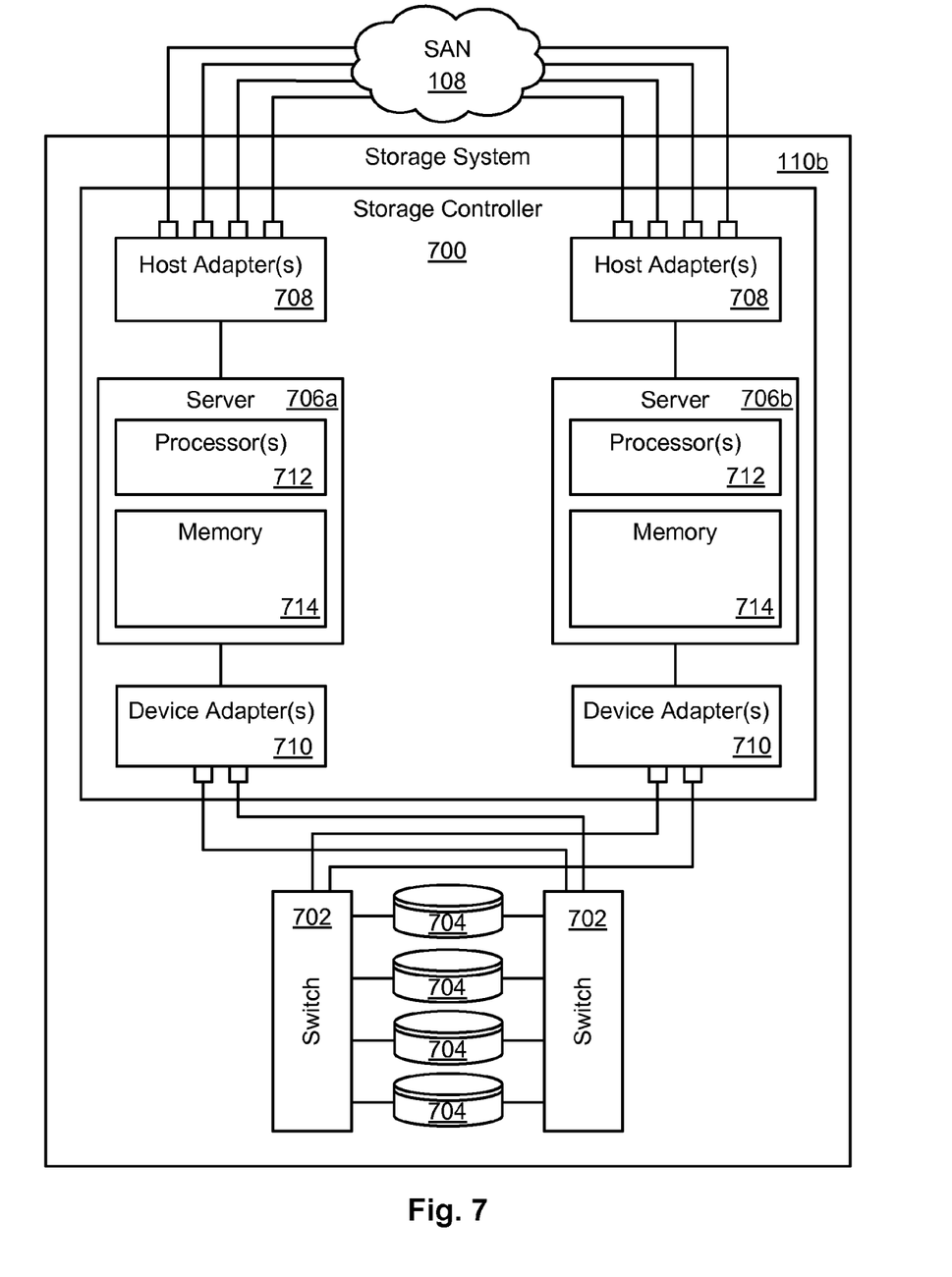
FIG. 7 is a high-level block diagram showing one example of a storage system in which the apparatus of FIG. 4 may be implemented.

Referring to FIG. 7, as previously mentioned, an apparatus 400 in accordance with the invention may, in certain embodiments, be implemented in devices such as storage systems 110. FIG. 7 shows one example of a storage system 110b that may be used to implement an apparatus 400 in accordance with the invention. In this embodiment, the storage system 110b includes a storage controller 700, one or more switches 702, and one or more storage devices 704, such as hard disk drives 704 or solid-state drives 704. The storage controller 700 may enable one or more hosts (e.g., open system and/or mainframe servers 106) to access data in one or more storage devices 704.

In selected embodiments, the storage controller 700 includes one or more servers 706. The storage controller 700 may also include host adapters 708 and device adapters 710 to connect to host devices 106 and storage devices 704, respectively. Multiple servers 706a, 706b may provide redundancy to ensure that data is always available to connected hosts 106. Thus, when one server 706a fails, the other server 706b may remain functional to ensure that I/O is able to continue between the hosts 106 and the storage devices 704. This process may be referred to as a "failover."

One example of a storage controller 700 having an architecture similar to that illustrated in FIG. 7 is the IBM DS8000™ enterprise storage system. The DS8000™ is a high-performance, high-capacity storage controller providing disk storage that is designed to support continuous operations. The DS8000™ series models may use IBM's POWER5™ servers 706a, 706b, which may be integrated with IBM's virtualization engine technology. Nevertheless, the apparatus and methods disclosed herein are not limited to the IBM DS8000™ enterprise storage system 110b, but may be implemented in comparable or analogous storage systems 110, regardless of the manufacturer, product name, or components or component names associated with the system 110. Furthermore, any system that could benefit from one or more embodiments of the invention is deemed to fall within the scope of the invention. Thus, the IBM DS8000™ is presented only by way of example and is not intended to be limiting.

In selected embodiments, each server 706 may include one or more processors 712 (e.g., n-way symmetric multiprocessors) and memory 714. The memory 714 may include volatile memory (e.g., RAM) as well as non-volatile memory (e.g., ROM, EPROM, EEPROM, hard disks, flash memory, etc.). The volatile memory 714 and non-volatile memory 714 may, in certain embodiments, store software modules that run on the processor(s) 712 and are used to access data in the storage devices 704. In certain embodiments, these software modules may include one or more of the modules illustrated in FIGS. 4 through 6.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A computer program product to dynamically adjust the amount of free space in a storage group, the computer program product comprising a non-transitory computer-readable medium having computer-usable program code embodied therein, the computer-usable program code comprising:
   computer-usable program code to monitor the amount of free space in an active storage group;
   computer-usable program code to maintain an overflow storage group comprising unused volumes;
   computer-usable program code to automatically move a volume from the overflow storage group to the active storage group when the free space in the active storage group falls below a lower threshold value; and
   computer-usable program code to automatically perform the following steps when the free space in the active storage group exceeds an upper threshold value: (1) transfer data from a volume in the active storage group to at least one other volume in the active storage group; and (2) move the volume from the active storage group to the overflow storage group.

2. The computer program product of claim 1, further comprising:
   computer-usable program code to move a volume identifier from a overflow storage group list to an active storage group list when moving the volume from the overflow storage group to the active storage group; and
   computer-usable program code to move a volume identifier from the active storage group list to the overflow storage group list when moving the volume from the active storage group to the overflow storage group.

3. The computer program product of claim 1, further comprising:
   computer-usable program code to rename the volume to match a volume identifier contained within an active storage group list when moving the volume from the overflow storage group to the active storage group; and
   computer-usable program code to rename the volume to match a volume identifier contained within an overflow storage group list when moving the volume from the active storage group to the overflow storage group.

4. The computer program product of claim 1, further comprising computer-usable program code to identify an optimal volume to move from the active storage group to the overflow storage group.

5. The computer program product of claim 4, wherein the optimal volume is selected from the group consisting of the volume with the most free space, the most remotely located volume, the lowest speed volume, the volume storing the fewest data sets, and the slowest-responding volume.

6. The computer program product of claim 1, further comprising computer-usable program code to automatically move a volume from the overflow storage group to the active storage group in response to an allocation error associated with the active storage group.

7. The computer program product of claim 1, further comprising computer-usable program code to at least one of redrive previously failed I/O and restart a software application after moving the volume from the overflow storage group to the active storage group.

8. An apparatus to dynamically adjust the amount of free space in a storage group, the apparatus comprising:
   a free-space monitoring module to monitor the amount of free space in an active storage group;
   a space management module configured to automatically move a volume from an overflow storage group to the active storage group when the free space in the active storage group falls below a lower threshold value; and
   the space management module further configured to automatically perform the following steps when the free space in the active storage group exceeds an upper threshold value: (1) transfer data from a volume in the active storage group to at least one other volume in the active storage group; and (2) move the volume from the active storage group to the overflow storage group.

9. The apparatus of claim 8, wherein the space management module is further configured to:
move a volume identifier from an overflow storage group list to an active storage group list when moving the volume from the overflow storage group to the active storage group; and
move a volume identifier from the active storage group list to the overflow storage group list when moving the volume from the active storage group to the overflow storage group.

10. The apparatus of claim 8, wherein the space management module is further configured to:
rename the volume to match a volume identifier contained within an active storage group list when moving the volume from the overflow storage group to the active storage group; and
rename the volume to match a volume identifier contained within an overflow storage group list when moving the volume from the active storage group to the overflow storage group.

11. The apparatus of claim 8, further comprising an identification module to identify an optimal volume to move from the active storage group to the overflow storage group.

12. The apparatus of claim 11, wherein the optimal volume is selected from the group consisting of the volume with the most free space, the most remotely located volume, the lowest speed volume, the volume storing the fewest data sets, and the slowest-responding volume.

13. The apparatus of claim 8, further comprising a remedy module to remedy an allocation error associated with the active storage group.

* * * * *